US009686629B2

(12) United States Patent
Tsurutome et al.

(10) Patent No.: US 9,686,629 B2
(45) Date of Patent: *Jun. 20, 2017

(54) REMOTELY PROVISIONED WIRELESS PROXY

(71) Applicant: TeleCommunication Systems, Inc., Annapolis, MD (US)

(72) Inventors: Kevin Tsurutome, San Francisco, CA (US); Bob Barcklay, Berkely, CA (US); Robert Wang, Castro Valley, CA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,289

(22) Filed: Dec. 16, 2015

(65) Prior Publication Data

US 2016/0100272 A1 Apr. 7, 2016

Related U.S. Application Data

(63) Continuation of application No. 14/219,609, filed on Mar. 19, 2014, which is a continuation of application
(Continued)

(51) Int. Cl.
*H04M 3/00* (2006.01)
*H04W 4/00* (2009.01)
(Continued)

(52) U.S. Cl.
CPC ............. *H04W 4/001* (2013.01); *H04L 67/12* (2013.01); *H04L 67/2814* (2013.01);
(Continued)

(58) Field of Classification Search
CPC .................................................... H04W 4/046
See application file for complete search history.

(56) References Cited

U.S. PATENT DOCUMENTS 6,336,117 B1 * 1/2002 Massarani ......... G06F 17/30867
707/711
6,799,201 B1 * 9/2004 Lee .................... G01C 21/3679
709/203
(Continued)

FOREIGN PATENT DOCUMENTS

JP EP1450236 A2 * 8/2004

*Primary Examiner* — Khalid Shaheed
(74) *Attorney, Agent, or Firm* — Tarolli, Sundheim, Covell & Tummino LLP

(57) ABSTRACT

A remotely provisioned proxy within a wireless/mobile phone that proxies a wireless communication path between a disconnected piconet (e.g., BLUETOOTH™) device and a network resource such as a universal resource locator (URL) via a mating mobile phone. Thus, an application proxy module embodied within the mobile phone provides managed access of a piconet device connected to the mating mobile phone to remote services. A disconnected piconet device uses the full data bandwidth available to a wireless phone, without the need for the disconnected piconet device to include its own separate wireless front end, or to require use of a modem within the mobile phone. Thus, using a mobile phone with application proxy, the user need not pay for the luxury of a tethered data plan.

9 Claims, 3 Drawing Sheets

Related U.S. Application Data

No. 13/738,525, filed on Jan. 10, 2013, now Pat. No. 8,712,408, which is a continuation of application No. 12/588,142, filed on Oct. 6, 2009, now Pat. No. 8,594,627.

(60) Provisional application No. 61/136,806, filed on Oct. 6, 2008.

(51) Int. Cl.
*H04L 29/08* (2006.01)
*H04W 88/18* (2009.01)

(52) U.S. Cl.
CPC ......... *H04L 67/2819* (2013.01); *H04W 4/008* (2013.01); *H04W 88/182* (2013.01)

(56) References Cited

U.S. PATENT DOCUMENTS

| | | | | |
|---|---|---|---|---|
| 2003/0028532 | A1* | 2/2003 | Dougu | G06F 17/30867 |
| 2007/0286133 | A1* | 12/2007 | Kirke | H04L 63/101 |
| | | | | 370/338 |
| 2008/0177460 | A1* | 7/2008 | Blackwood | G01C 21/26 |
| | | | | 701/118 |

* cited by examiner

REMOTELY PROVISIONED WIRELESS PROXY

This application is a continuation of U.S. patent application Ser. No. 14/219,609 entitled "Remotely Provisioned Wireless Proxy" to Tsurutome et al., filed on Mar. 19, 2014; which in turn is a continuation of U.S. patent application Ser. No. 13/738,525 entitled "Remotely Provisioned Wireless Proxy" to Tsurutome et al., filed on Jan. 10, 2013, now U.S. Pat. No. 8,712,408; which in turn is a continuation of U.S. patent application Ser. No. 12/588,142 entitled "Remotely Provisioned Wireless Proxy" to Tsurutome et al., filed on Oct. 6, 2009, now U.S. Pat. No. 8,594,627; which claims priority from U.S. Provisional Application No. 61/136,806, entitled "Remotely Provisioned Wireless Proxy" to Tsurutome et al., filed Oct. 6, 2008, the entirety of all of which are explicitly incorporated herein by reference.

BACKGROUND OF THE INVENTION

1. Field of the Invention

This invention relates generally to wireless telecommunications. More particularly, it relates to improved integration, provisioning, and provisioning of two-way data communication services with vehicle piconet devices, including In-Car Navigation Systems, Personal Navigation Devices and Ultra-Mobile PCs.

2. Background of the Related Art

This invention relates to provisioning of two-way data communication services with vehicle piconet devices, including In-Car Navigation Systems, Personal Navigation Devices and Ultra-Mobile PCs. Some conventional techniques include the use of an embedded communications module. An embedded communications module (ECM) provides a dedicated data communications module within a mobile device and vehicle hardware. But the cost of ECM hardware is a problem as is the cost of the data connection. Solutions that have used this approach tend to cost consumers $10-$12 per month, which is too high for many consumers. Moreover, the cost of provisioning and managing SIMs and accounts also adds to the cost of the solution.

Other companies have used a modem within a mobile phone to provide a data service, thus making use of a mobile phone as a modem. A mobile phone used as a modem is typically offered by wireless operators for consumers to connect their PC to the Internet. However, these solutions have high priced data plans, typically $30 to $60/month, and thus most consumers do not purchase this option for their mobile phones. This solution can also be difficult to configure, and does not provide a way to provide granular management of bandwidth and services. Moreover, access can only be turned on or off for all services.

Still other conventional solutions have deployed data over voice techniques, e.g., Airbiquity™ data over voice solution, e.g., as found at http://www.airbiquity.com; embedded data communications modules; and M2M service providers such as Jasper wireless. Unfortunately, data over voice solutions are typically very low bandwidth and not suitable for many applications.

SUMMARY OF THE INVENTION

In accordance with the principles of the present invention, a method of provisioning a wireless phone from a network server to autonomously reject a given URL requested by a piconet device connected to the wireless phone comprises compiling a black list of universal resource locator (URL) addresses to a wireless phone. The black list relates to at least one URL that can be requested by a piconet device connected to the wireless phone. The black list of URLs is provided to the wireless phone from a network server via a wireless phone connection. In this way, the wireless phone can autonomously reject a request by the piconet device to a given URL in the black list.

A method of provisioning a wireless phone from a network server to autonomously permit a given URL requested by a piconet device connected to the wireless phone in accordance with another aspect of the invention comprises compiling a white list of universal resource locator (URL) addresses to a wireless phone. The white list relates to at least one URL that can be requested by a piconet device connected to the wireless phone. The white list of URLs is provided to the wireless phone from a network server via a wireless phone connection, whereby the wireless phone can autonomously permit and pass on a request by the piconet device to a given URL in the white list.

In accordance with yet another method of provisioning a wireless phone from a network server to autonomously redirect a given URL requested by a piconet device connected to the wireless phone comprises compiling a redirect list of universal resource locator (URL) addresses to a wireless phone. The redirect list relates to at least one URL that can be requested by a piconet device connected to the wireless phone. The redirect list of URLs is provided to the wireless phone from a network server via a wireless phone connection. In this way, the wireless phone can autonomously pass on a request by the piconet device to a replacement URL from the redirect list based on a match to the requested URL.

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

The present invention provides a remotely provisioned proxy within a wireless/mobile phone that proxies a wireless communication path between a disconnected piconet (e.g., BLUETOOTH™) device and a network resource such as a universal resource locator (URL) via a mating mobile phone. Thus, an application proxy module embodied within the mobile phone provides managed access to remote services. A disconnected piconet device uses the full data bandwidth available to a wireless phone, without the need for the disconnected piconet device to include its own separate wireless front end, or to require use of a modem within the mobile phone. Thus, using a mobile phone with application proxy, the user need not pay for the luxury of a tethered data plan.

Figure 1:
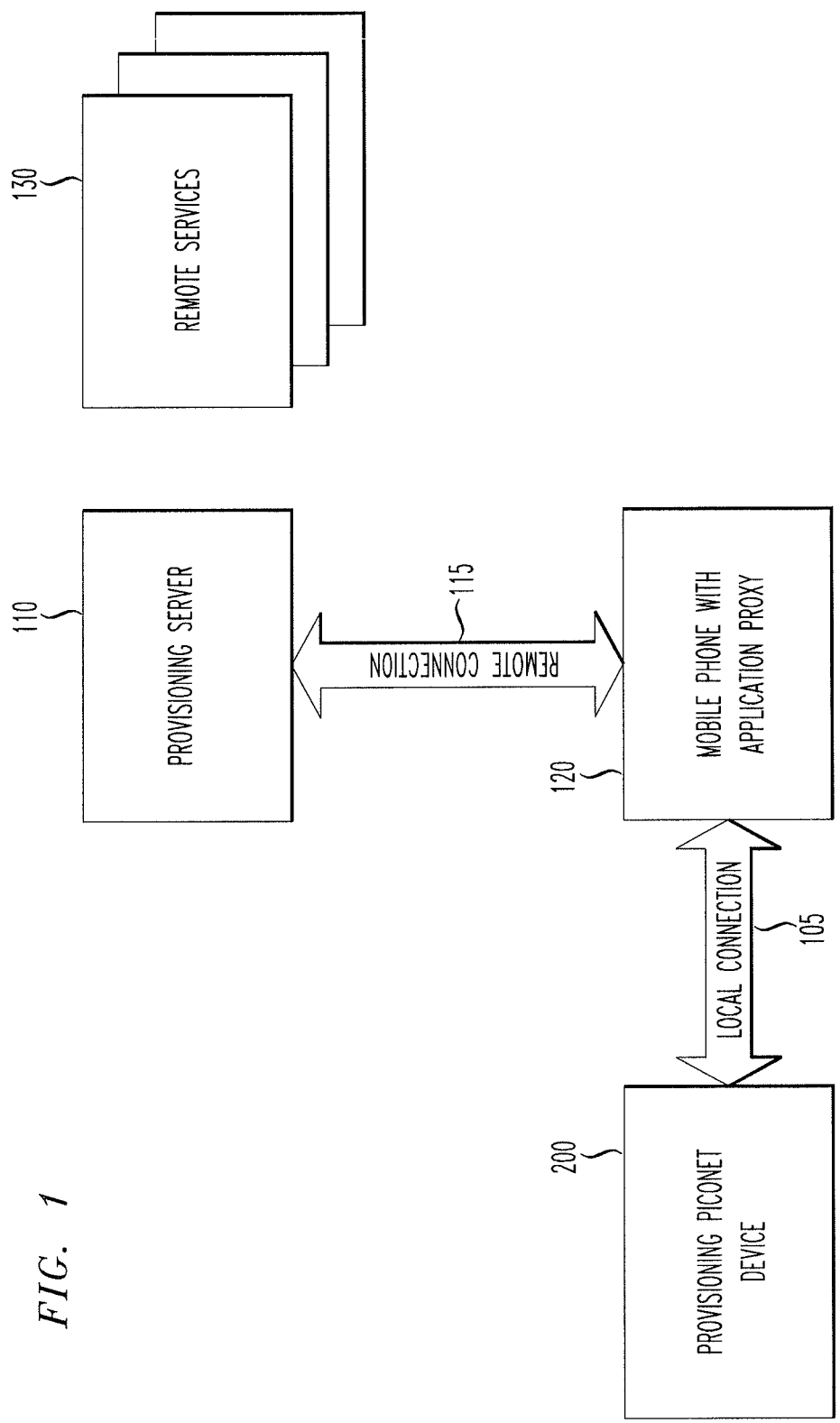
FIG. 1 depicts an application proxy in a mobile phone, connected to a disconnected piconet device, and in communication with a provisioning server, in accordance with the principles of the present invention.

FIG. 1 depicts an application proxy in a mobile phone, connected to a disconnected piconet device, and in communication with a provisioning server, in accordance with the principles of the present invention.

In particular, as shown in FIG. 1, a mobile phone 120 includes an application proxy that proxies information between a provisioning server 110 to a disconnected piconet device 200. The mobile phone 120 establishes a piconet (e.g., BLUETOOTH™) local connection 105 with the disconnected piconet device 200, and a remote wireless connection using a relevant wireless phone protocol (e.g., VoIP) via a remote connection 115. This permits the disconnected piconet device 200 to get information from remote services 130.

The disconnected piconet device 200 can be, e.g., a portable navigation device (PND), telematics hardware, an ultra mobile personal computer (PC), a handheld game, a music player, etc.

The local connection 105 is a piconet such as BLUETOOTH™. The invention is preferably implemented using the Serial Port BLUETOOTH™ Profile which is common on BLUETOOTH™-enabled phones and devices.

The mobile phone with application proxy 120 can be, e.g., a J2ME, BREW, RIM, Symbian, or a Windows Mobile phone.

The remote connection 115 can be established in conformance with an appropriate protocol, e.g., WiMax, EVDO, 1×RTT, EDGE, H SDPA, etc.

Preferably the provisioning server 110 and remote service 130 are accessible on the Internet.

The wireless operator and application provider can manage/monitor the services being provided to the disconnected piconet (e.g., BLUETOOTH™ device). For example, if a wireless operator doesn't want to offer a particular remote service such as YellowPages.com point-of-interest (POI) search, then the wireless operator can disable, block or replace the service with their own.

The wireless operator can disable/turn off users on a user by user, application by application, or device by device basis.

Preferably a generic connection is established which doesn't rely on both the BLUETOOTH™ device and phone to support a particular BLUETOOTH™ profile.

Using the application proxy 100 of a mobile phone with application proxy 120, a disconnected piconet device 200 such as a navigation device can interact with both remote Internet services 130 and services available on the mobile phone with application proxy 120.

Figure 2:
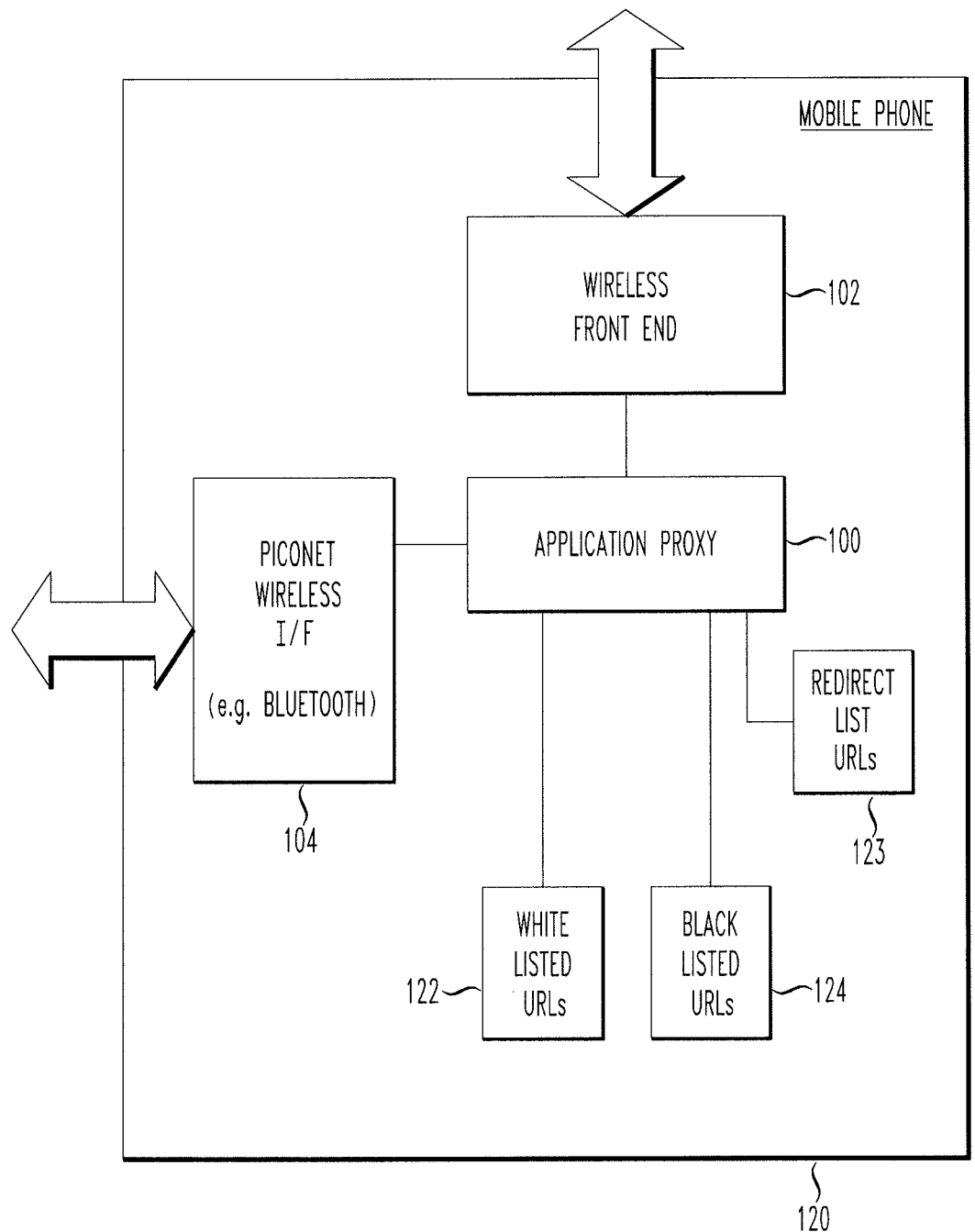
FIG. 2 shows a wireless phone including an application proxy, in accordance with the principles of the present invention.

FIG. 2 shows a wireless phone including an application proxy, in accordance with the principles of the present invention.

In particular, as shown in FIG. 2, a wireless phone 120 includes an otherwise conventional wireless front end 102 for communication with a base station (not shown), and a piconet wireless interface 104 for communication with, e.g., BLUETOOTH™ piconet devices such as a hands-free headset, or hands-free operation in a vehicle (i.e., a disconnected piconet device 200).

Importantly, the wireless phone 120 includes an application proxy 100 that provides proxied facilitation of retrieval of information on a web page from the Internet requested by and for the disconnected piconet device 200.

The disconnected piconet device 200 in accordance with the present invention includes a short range piconet wireless interface, e.g.; a BLUETOOTH™ compatible interface. The piconet interface is capable only of short range wireless communications, e.g., within 20 feet. The present invention provides a proxy within a wireless phone 120 to enable the disconnected piconet device 200 to be provided with information from an approved web site.

Preferably, the web sites accessible by the disconnected piconet device 200 are approved or disapproved by a service provider. The user of the wireless phone 120 may pre-configure approved and/or disapproved web sites (universal resource locators (URLs) with the service provider. In the disclosed embodiments, approved URLs are provided by the service provider to the mobile phone 120 as white listed URLs 122, and disapproved URLs are provided by the service provider to the mobile phone 120 as black listed URLs 124.

Figure 3:
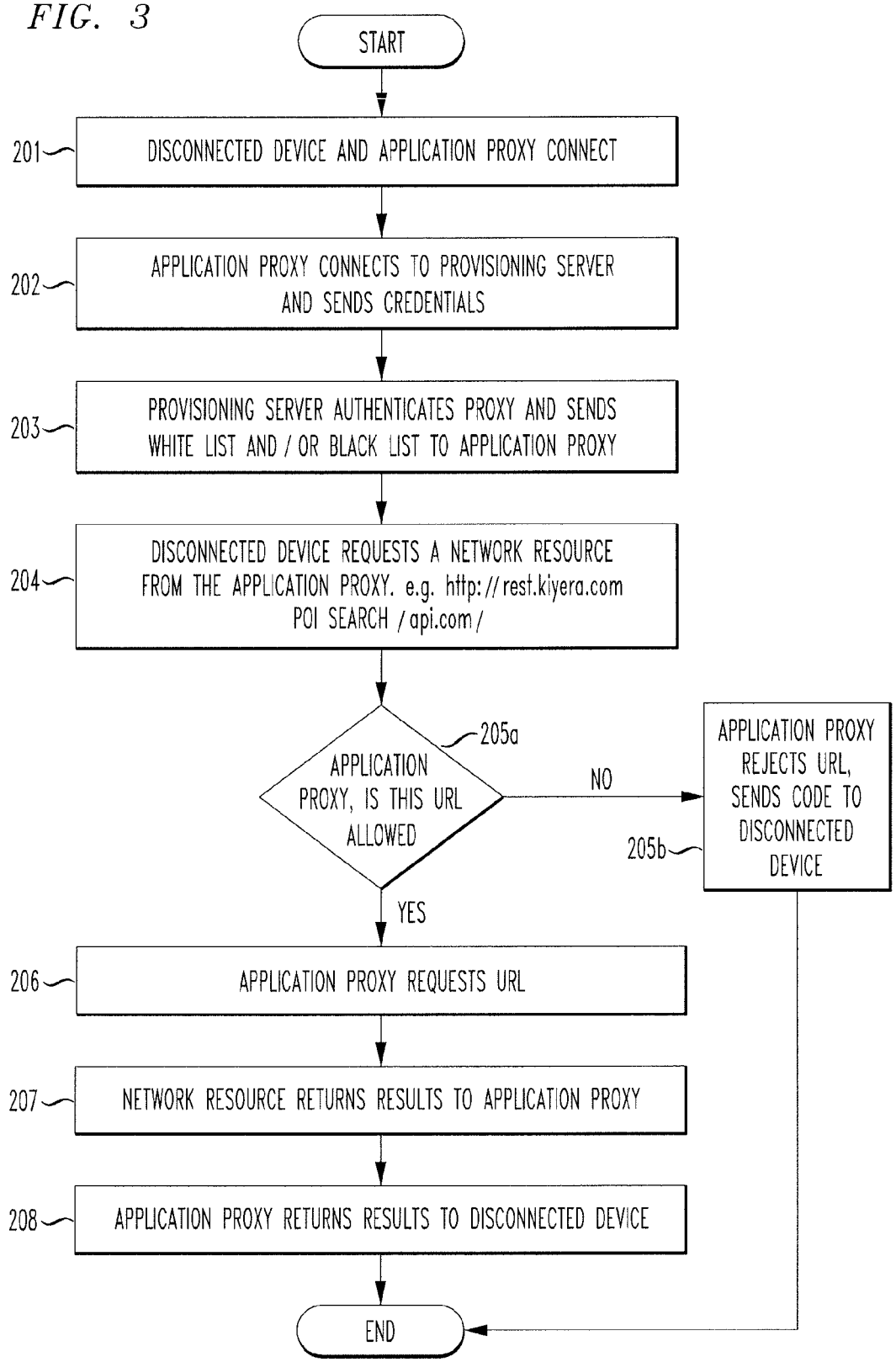
FIG. 3 shows an example method of remotely provisioned wireless proxy, in accordance with the principles of the present invention.

FIG. 3 shows an example method of remotely provisioned wireless proxy, in accordance with the principles of the present invention.

In particular, as shown in step 201 of FIG. 3, the disconnected piconet device 200 and the mobile phone with application proxy 120 establish a suitable connection, e.g., over BLUETOOTH™ using the serial port profile. This allows the mobile phone with application proxy 120 and the disconnected piconet device 200 to send messages to each other.

In step 202, the mobile phone with application proxy 120 connects to the provisioning server 110 and sends credentials. The disconnected piconet device 200 authenticates by sending authentication information (some unique identifier) to the mobile phone with application proxy 120.

In step 203, the provisioning server 110 authenticates the mobile phone with application proxy 120, and sends a white list and/or black list to the mobile phone with application proxy 120. The mobile phone with application proxy 120 sends the disconnected piconet device 200 authentication information along with its own identifying information to the provisioning server 110 to make sure a valid account exists and to get any permissions.

In step 204, the disconnected piconet device 200 requests a network resource via the mobile phone with application proxy 120, e.g., http://rest.kivera.com/POISearch/api.jsp. The provisioning server 110 sends back an OK status as well as allowed (and/or disallowed) locations, preferably returned as a list of URL's with wildcards (example: http://a.kivera.com/*). For each combination of mobile phone with application proxy 120 and disconnected piconet device 200, the provisioning server 110 returns a list of allowed URLs (stored in a white listed URLs table) 122 and/or disallowed URLs (stored in a black listed URLs table) 124.

This remote provisioning to the mobile phone with application proxy 120 from the provisioning server 110 enables the mobile phone with application proxy 120 to make decisions about what communication to allow without using bandwidth.

The mobile phone with application proxy 120 is ideally provisioned for each session. Because the mobile phone with application proxy 120 is provisioned for each session, the services the disconnected piconet device 200 can access can be controlled at a very detailed level and with no changes to the disconnected piconet device 200 or the mobile phone with application proxy 120.

In step 205a, the mobile phone with application proxy 120 determines if a particular URL is allowed—not the network resource 130 and not the provisioning server 110. This is important, and greatly reduces bandwidth at the time that the network resource is requested by the disconnected piconet device 200.

The mobile phone with application proxy 120 then compares the requested URL against the network-provided-but-locally-stored white listed URLs table 122 and/or black listed URL table 124.

If the mobile phone with application proxy 120 determines that the URL requested by the disconnected piconet device 200 is permitted to access the requested URL, then processing continues to step 206. If not, in step 205*b*, the mobile phone with application proxy 120 rejects the URL, and sends an appropriate rejection code or other information regarding the rejection or blocking of the requested URL to the disconnected piconet device 200.

In step 206, the disconnected piconet device 200 sends a request for the given URL in step 205 to the mobile phone with application proxy 120, which passes on the request for the given URL.

In step 207, the requested network resource 130 returns appropriate results to the mobile phone with application proxy 120.

In step 208, the mobile phone with application proxy 120 returns results to the disconnected piconet device 200 of the now-authorized requested URL.

For instance, the disconnected piconet device 200 wants to retrieve a local search for pizza. It determines that it wants to connect to a website with a given URL, e.g.: http://rest.kivera.com/POISearch/api.jsp?term=pizza&location=san%20francisco,CA. The disconnected piconet device 200 sends a request for the given URL in step 205 to the mobile phone with application proxy 120. In step 207, the mobile phone with application proxy 120 itself determines from its white listed URLs 122 and black listed URLs 124 obtained for the session that the requested website address (URL) is an allowed location, so it forwards the request for the URL to http://rest.kivera.com/POISearch/api.jsp. In step 208, the requested URL, i.e., http://rest.kivera.com/POISearch/api.jsp returns the requested results (pizza places in San Francisco) to the mobile phone with application proxy 120, which in turn returns the results to the disconnected piconet device 200.

The invention can be billed by a wireless operator using their existing billing infrastructure (such as BREW or QPass) for wireless applications.

Other services available on the mobile phone may be utilized, e.g., GPS, file storage, access to media files, etc.

The invention can be used with any non-connected device, such as a handheld game or PC. The invention also has particular applicability to both wireless operators and navigation device manufacturers. Vehicle manufacturers can use the invention to provide low-cost connected services to vehicles both with and without navigation devices. Portable navigation device (PND) manufacturers can use the invention to provide low-cost connected services to PND devices. Ultra-mobile PC manufacturers can use the invention to provide connectivity without the cost of an embedded communications module (ECM), for instance, ultra-mobile PCs, PND and in-car navigation providers using mobile applications as a communication mechanism.

The types of services provided to the disconnected device may be expanded. For instance, the mobile phone with application proxy may integrate with other aspects of the phone or piconet disconnected device, including SMS, microphone, GPS, gyroscope, etc.

While the invention has been described with reference to the exemplary embodiments thereof, those skilled in the art will be able to make various modifications to the described embodiments of the invention without departing from the true spirit and scope of the invention.

What is claimed is:

1. A method of forwarding information from a physical mobile phone to a physical in-vehicle device, comprising:
    establishing a mobile phone proxy on said physical mobile phone;
    establishing a short range wireless communication between said physical mobile phone and a physical in-vehicle telematics device; and
    transmitting a white list of authorized network resource addresses from said physical mobile phone to said in-vehicle telematics device over said short range wireless communication;
    wherein said white list of authorized network resource addresses comprises a plurality of universal resource locators (URLs), wherein said plurality of URLs include at least one network resource address including a wildcard portion.

2. The method of forwarding information from a physical mobile phone to a physical in-vehicle device according to claim 1, wherein said in-vehicle telematics device comprises:
    a portable navigation device.

3. The method of forwarding information from a physical mobile phone to a physical in-vehicle device according to claim 1, further comprising:
    obtaining said white list of authorized network resource addresses from a provisioning server.

4. The method of forwarding information from a physical mobile phone to a physical in-vehicle device according to claim 1, further comprising:
    transmitting Global Positioning System (GPS) based information from said physical mobile phone to said in-vehicle device over said short range wireless communication.

5. A method of forwarding information from a physical mobile phone to a physical in-vehicle device, comprising:
    establishing a mobile phone proxy on said physical mobile phone;
    establishing a short range wireless communication between said physical mobile phone and a physical in-vehicle telematics device; and
    transmitting a white list of authorized network resource addresses from said physical mobile phone to said in-vehicle telematics device over said short range wireless communication; wherein said white list of authorized network resource addresses comprises a plurality of universal resource locators (URLs), wherein said in-vehicle device interacts with remote Internet services via access to an addressed network resource address included in said white list.

6. A method of forwarding information from a physical mobile phone to a physical in-vehicle device, comprising:
    establishing a mobile phone proxy on said physical mobile phone;
    establishing a short range wireless communication between said physical mobile phone and a physical in-vehicle telematics device; and
    transmitting a black list of unauthorized network resource addresses from said physical mobile phone to said in-vehicle telematics device over said short range wireless communication;
    wherein said in-vehicle telematics device interacts with remote Internet services via access to an addressed network resource address not appearing in said black list, wherein said black list of unauthorized network resource addresses comprises a plurality of universal resource locators (URLs), wherein said plurality of URLs includes at least one wildcard portion.

7. The method of forwarding information from a physical mobile phone to a physical in-vehicle device according to claim 6, wherein said in-vehicle telematics device comprises:
   a portable navigation device.

8. The method of forwarding information from a physical mobile phone to a physical in-vehicle device according to claim 6, further comprising:
   obtaining said black list of unauthorized network resource addresses from a provisioning server.

9. The method of forwarding information from a physical mobile phone to a physical in-vehicle device according to claim 6, further comprising:
   transmitting Global Positioning System (GPS) based information from said physical mobile phone to said in-vehicle telematics device over said short range wireless communication.

\* \* \* \* \*